(12) United States Patent  
Sasaki

(10) Patent No.: US 7,694,764 B2  
(45) Date of Patent: Apr. 13, 2010

(54) POWER OUTPUT SYSTEM, VEHICLE INCLUDING THE SAME, AND METHOD OF CONTROLLING POWER OUTPUT SYSTEM

(75) Inventor: Toshitake Sasaki, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 40 days.

(21) Appl. No.: 12/245,150

(22) Filed: Oct. 3, 2008

(65) Prior Publication Data

US 2009/0099759 A1    Apr. 16, 2009

(30) Foreign Application Priority Data

Oct. 11, 2007    (JP) ............................. 2007-265415

(51) Int. Cl.
*B60W 20/00* (2006.01)

(52) U.S. Cl. ............... 180/65.285; 180/309; 903/930

(58) Field of Classification Search ............ 180/65.21, 180/65.265, 65.27, 65.285, 309; 903/930; 701/113; 60/274
See application file for complete search history.

(56) References Cited

U.S. PATENT DOCUMENTS

| | | | | |
|---|---|---|---|---|
| 5,693,877 A | * | 12/1997 | Ohsuga et al. | 60/274 |
| 6,012,284 A | * | 1/2000 | Tanaka et al. | 60/297 |
| 6,321,530 B1 | * | 11/2001 | Hoshi et al. | 60/274 |
| 6,327,852 B1 | * | 12/2001 | Hirose | 60/297 |
| 6,615,578 B2 | * | 9/2003 | Yamazaki et al. | 60/284 |
| 7,055,312 B2 | * | 6/2006 | Osawa et al. | 60/285 |
| 7,152,395 B2 | * | 12/2006 | Inoue et al. | 60/286 |
| 7,624,568 B2 | * | 12/2009 | Ando et al. | 60/277 |

FOREIGN PATENT DOCUMENTS

| | | |
|---|---|---|
| JP | 2001-41026 A | 2/2001 |
| JP | 2006-291916 A | 10/2006 |
| JP | 2007-162508 A | 6/2007 |

\* cited by examiner

*Primary Examiner*—Frank B Vanaman
(74) *Attorney, Agent, or Firm*—Kenyon & Kenyon LLP

(57) ABSTRACT

A power output system that provides power to a driveshaft is provided which includes an internal combustion engine, an electric motoring mechanism, an electric storage device, a first exhaust gas channel that guides exhaust gas from the engine directly to an exhaust gas purifying catalyst, a second exhaust gas channel which guides the exhaust gas from the engine to the exhaust gas purifying catalyst via an unburned-component adsorber, a channel switching mechanism operable to switch a channel of the exhaust gas from the engine between the first exhaust gas channel and the second exhaust gas channel, a pressure accumulator operable to accumulate therein a negative pressure produced through rotation of the engine, a negative-pressure introducing/releasing mechanism that selectively permits and inhibits introduction of the negative pressure from the pressure accumulator into the channel switching mechanism, and a controller that controls the electric motoring mechanism and the negative-pressure introducing/releasing mechanism.

9 Claims, 6 Drawing Sheets

US 7,694,764 B2

POWER OUTPUT SYSTEM, VEHICLE INCLUDING THE SAME, AND METHOD OF CONTROLLING POWER OUTPUT SYSTEM

INCORPORATION BY REFERENCE

The disclosure of Japanese Patent Application No. 2007-265415 filed on Oct. 11, 2007, including the specification, drawings and abstract, is incorporated herein by reference in its entirety.

BACKGROUND OF THE INVENTION

1. Field of the Invention

The invention relates to a power output system that provides power to a driveshaft, a vehicle including the power output system, and a method of controlling the power output system.

2. Description of Related Art

Japanese Patent Application Publication No. 2001-41026 (JP-A-2001-41026) discloses an internal combustion engine including a HC adsorption apparatus provided upstream of a catalytic converter in an exhaust passage. The HC adsorption apparatus of this engine includes a main passage, a switching valve that opens and closes the main passage, and a bypass passage that bypasses the main passage, and a HC adsorbent that adsorbs hydrocarbon (HC) contained in exhaust gas is disposed in the bypass passage. The switching valve is coupled to a diaphragm of a diaphragm mechanism, and a variable pressure chamber of the diaphragm mechanism is connected to an intake manifold via a negative pressure feed line and a vacuum switching valve (VSV). When the VSV is turned on, a negative pressure produced through the operation of the engine is supplied to the variable pressure chamber of the diaphragm mechanism so as to deform the diaphragm, and the switching valve operates, in accordance with the deformation of the diaphragm, to close the main passage, so that the exhaust gas of the engine passes through the HC adsorbent in the bypass passage and then flows into the catalytic converter. When the VSV is turned off, the atmospheric pressure is introduced into the variable pressure chamber of the diaphragm mechanism via the negative pressure feed line, causing no deformation of the diaphragm, and the switching valve is placed in the fully opened state, so that the exhaust gas of the engine flows into the catalytic converter via the main passage, without passing through the HC adsorbent.

In the internal combustion engine as described above, when the catalytic converter has not been sufficiently warmed up, the negative pressure produced through the operation of the engine is used to switch the exhaust gas channel from the main passage to the bypass passage, so that hydrocarbon as an unburned component in the exhaust gas is adsorbed by the HC adsorbent in the bypass passage. After the catalytic converter is sufficiently warmed up, the exhaust gas channel is switched from the main passage to the bypass passage again, so that the adsorbed unburned hydrocarbon can be cleaned (i.e., converted into harmless substances) by the catalytic converter. However, the negative pressure cannot be produced while the engine is at rest or stopped, and, even if the engine is operated, a sufficiently reduced pressure may not be developed, depending on the operating conditions (load) of the engine. Thus, in the internal combustion engine as described above, switching of the exhaust gas channel from the main passage to the bypass passage may not be accomplished because of a shortage or lack of the negative pressure when the switching is to be done, and an unburned component, such as hydrocarbon, in the exhaust gas may be discharged to the outside without being converted into harmless substances.

SUMMARY OF THE INVENTION

It is an object of the invention to provide a power output system that prevents an unburned component in exhaust gas of an internal combustion engine from being discharged to the outside, with improved reliability, and to provide a vehicle including the power output system and a method of controlling a power output system.

A first aspect of the invention relates to a power output system that provides power to a driveshaft. The power output system includes: an internal combustion engine operable to provide power to the driveshaft, an electric motoring mechanism operable to forcedly rotate the internal combustion engine to effect motoring of the engine, an electric storage device operable to supply electric power to the electric motoring mechanism, a first exhaust gas channel that guides exhaust gas from the internal combustion engine directly to an exhaust gas purifying catalyst, a second exhaust gas channel which contains an unburned-component adsorber capable of adsorbing an unburned component in the exhaust gas, and which guides the exhaust gas from the engine to the exhaust gas purifying catalyst via the unburned-component adsorber, a channel switching mechanism operable to switch a channel of the exhaust gas from the internal combustion engine between the first exhaust gas channel and the second exhaust gas channel, by using a negative pressure, a pressure accumulator connected to an intake system of the internal combustion engine and operable to accumulate therein a negative pressure produced through rotation of the internal combustion engine, a negative-pressure introducing/releasing mechanism that selectively permits and inhibits introduction of the negative pressure from the pressure accumulator into the channel switching mechanism, and a controller that controls the electric motoring mechanism and the negative-pressure introducing/releasing mechanism, based on a condition of the electric storage device and a pressure accumulation state of the pressure accumulator.

In the power output system as described above, the internal combustion engine is forced to be rotated, namely, motoring of the engine is effected, by driving the electric motoring mechanism using electric power supplied from the electric storage device, so that a negative pressure can be produced through the motoring and introduced into the channel switching mechanism via the pressure accumulator. Also, in the power output system, the negative pressure produced through rotation of the engine is accumulated in the pressure accumulator connected to the intake system, so that the negative pressure accumulated in the pressure accumulator can be introduced into the channel switching mechanism. Thus, in the power output system of the first aspect of the invention, the negative pressure used for switching the channel of the exhaust gas from the engine between the first exhaust gas channel and the second exhaust gas channel containing the unburned-component adsorber is selected from the negative pressure produced through motoring of the engine by the electric motoring mechanism and the negative pressure accumulated in the pressure accumulator, depending on a condition of the electric storage device and the pressure accumulation state of the pressure accumulator. Since a negative pressure is favorably and reliably provided in this manner, the possibility of a failure to introduce a negative pressure into the channel switching mechanism is reduced or eliminated. Consequently, the channel of the exhaust gas is more appropriately switched between the first exhaust gas channel and the second exhaust gas channel, and an unburned component in the exhaust gas is more reliably prevented or kept from being discharged to the outside.

A second aspect of the invention relates to a method of controlling a power output system. The power output system includes: an internal combustion engine operable to provide power to a driveshaft, electric motoring means for forcedly rotating the internal combustion engine to effect motoring of the engine, electric storage means for supplying electric power to the electric motoring means, a first exhaust gas channel that guides exhaust gas from the internal combustion engine directly to an exhaust gas purifying catalyst, a second exhaust gas channel which contains unburned-component adsorbing means for adsorbing an unburned component in the exhaust gas, and which guides the exhaust gas from the engine to the exhaust gas purifying catalyst via the unburned-component adsorbing means, channel switching means for switching a channel of the exhaust gas from the internal combustion engine between the first exhaust gas channel and the second exhaust gas channel, by using a negative pressure, pressure accumulating means connected to an intake system of the internal combustion engine, for accumulating therein a negative pressure produced through rotation of the internal combustion engine, and negative-pressure introducing/releasing means for selectively permitting and inhibiting introduction of the negative pressure from the pressure accumulating means into the channel switching means. The method of controlling the power output system includes the steps of controlling the electric motoring means and the negative-pressure introducing/releasing means so as to cause the electric motoring means to effect motoring of the engine and thereby switch a channel of the exhaust gas from the first exhaust gas channel to the second exhaust gas channel when the electric storage means is in a condition that permits the motoring by the electric motoring means, prior to start-up of the internal combustion engine, and controlling the electric motoring means and the negative-pressure introducing/releasing means so as to switch the channel of the exhaust gas from the first exhaust gas channel to the second exhaust gas channel by using only the negative pressure accumulated in the pressure accumulating means, without effecting motoring by the electric motoring means, when the electric storage means is not in a condition that permits the motoring by the electric motoring means, prior to start-up of the internal combustion engine, and the pressure accumulation state of the pressure accumulating means satisfies a predetermined condition.

According to the method as described above, a negative pressure is favorably and reliably provided, and the possibility of a failure to introduce a negative pressure into the channel switching mechanism is reduced or eliminated. Consequently, the channel of the exhaust gas is more appropriately switched between the first exhaust gas channel and the second exhaust gas channel, and an unburned component in the exhaust gas is more reliably prevented or kept from being discharged to the outside.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
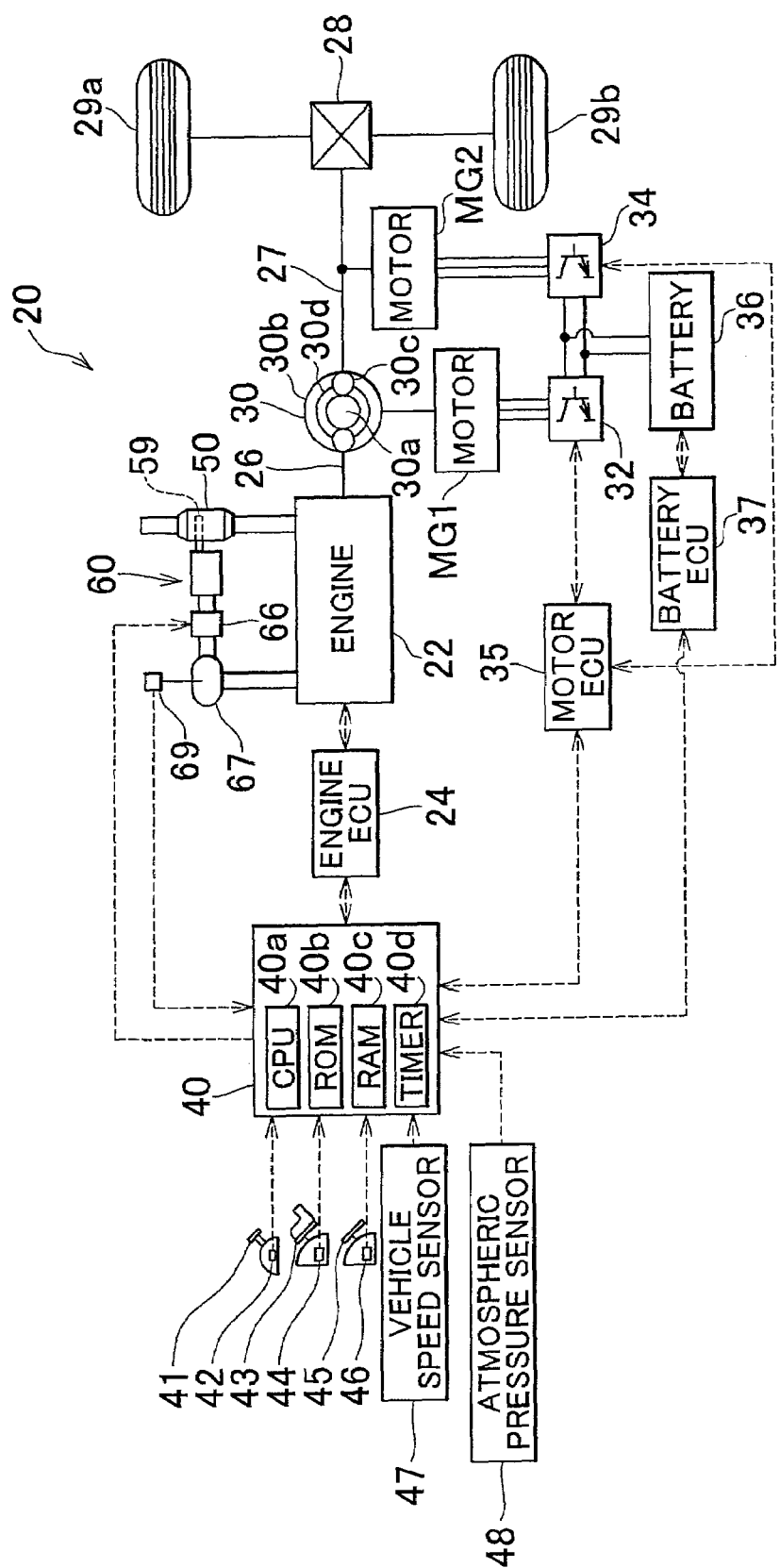
FIG. 1 is a schematic view showing the construction of a hybrid vehicle 20 provided with a power output system according to one embodiment of the invention.
Figure 2:
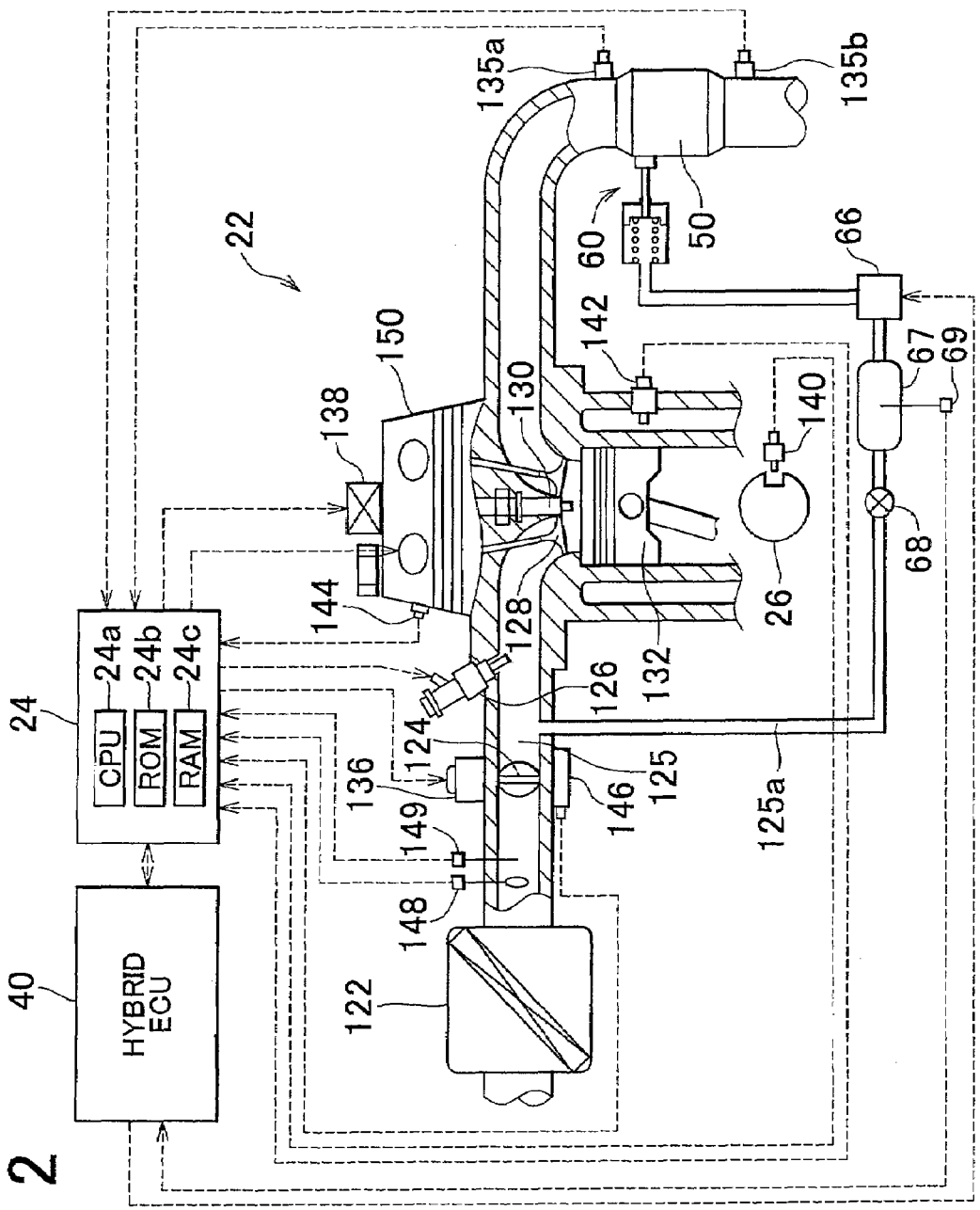
FIG. 2 is a schematic view showing the construction of an engine 22 installed on the hybrid vehicle 20.

FIG. 1 schematically illustrates the construction of a hybrid vehicle 20 provided with a power output system according to one embodiment of the invention. FIG. 2 schematically illustrates the construction of an engine 22 installed on the hybrid vehicle 20. As shown in FIG. 1, the hybrid vehicle 20 of this embodiment includes the engine 22, a 3-axes-type power distribution/integration mechanism 30 connected via a damper (not shown) to a crankshaft 26 as an output shaft of the engine 22, a motor MG1 connected to the power distribution/integration mechanism 30 and capable of generating electric power, a motor MG2 connected to the power distribution/integration mechanism 30, and an electronic control unit (which will be called "hybrid ECU") 40 for controlling the whole system of the hybrid vehicle 20.

The engine 22 is constructed as an internal combustion engine capable of delivering power by using a hydrocarbon-base fuel, such as gasoline or light oil. In the engine 22 as shown in FIG. 2, air that has been cleaned by an air cleaner 122 is taken into an intake port of each cylinder via a throttle valve 124, and fuel, such as gasoline, is injected from a fuel injection valve 126 toward the intake air, to provide a mixture of air and fuel. The air-fuel mixture thus obtained is drawn into a combustion chamber via an intake valve 128, and explodes and burns in the combustion chamber in response to a spark made by an ignition plug 130. Then, the reciprocating motion of a piston 132 resulting from the explosion and burning of the air-fuel mixture is converted into rotary motion of the crankshaft 26. Exhaust gas emitted from the combustion chamber is discharged to the outside, via an exhaust gas purifying device 50 that purifies the exhaust gas of pollutants, such as carbon monoxide (CO), hydrocarbon (HC) and nitrogen oxides (NOx).

The engine 22 as described above is controlled by an electronic control unit for the engine (which will be called "engine ECU") 24. The engine ECU 24 is configured as a microprocessor having a CPU 24a as a main component, and includes a ROM 24b that stores control programs, a RAM 24c that temporarily stores data, input and output ports and communication ports (not shown), etc., as well as the CPU 24a. The engine ECU 24 receives signals from various sensors that detect various conditions of the engine 22, via an input port (not shown). For example, the engine ECU 24 receives, via the input port, a crank position signal from a crank position sensor 140 that detects the rotational position of the crankshaft 26, a coolant temperature signal from a water temperature sensor 142 that detects the temperature of a coolant of the engine 22, a cam position signal from a cam position sensor 144 that detects the rotational position of a camshaft that opens and closes the intake valve 128 and exhaust valve through which gas is fed into and discharged from the combustion chamber, a throttle position signal from a throttle valve position sensor 146 that detects the position of a throttle valve 124, a signal indicative of the intake air amount from an air flow meter 148 mounted in the intake pipe, a signal indicative of the intake air temperature from a temperature sensor 149 mounted in the intake pipe, a signal indicative of the air-fuel ratio AF from an air-fuel ratio sensor 135*a*, an oxygen signal from an oxygen sensor 135*b*, and other signals. Also, various control signals for operating the engine 22 are generated from the engine ECU 24. For example, the engine ECU 24 sends, via the output port, a drive signal to the fuel injection valve 126, a drive signal to a throttle motor 136 that adjusts the position of the throttle valve 124, a control signal to an ignition coil 138 integrated with an igniter, and a control signal to a variable valve timing mechanism 150 capable of changing the open/close timing of the intake valve 128. The engine ECU 24, which communicates with the hybrid ECU 40, controls the operation of the engine 22 in response to a control signal or signals from the hybrid ECU 40, and sends data relating to the operating conditions of the engine 22 to the hybrid ECU 40 as needed.

Figure 3:
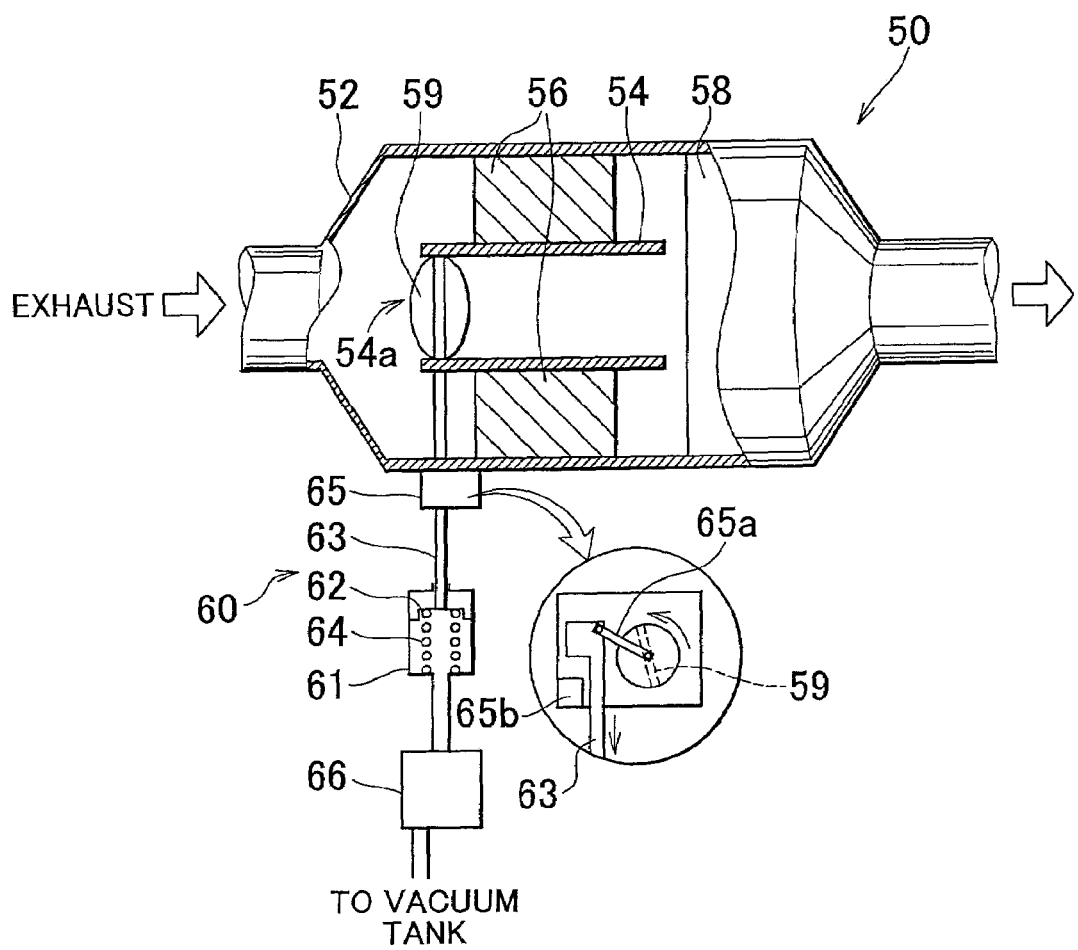
FIG. 3 is a schematic view showing the construction of an exhaust gas purifying device 50 that cleans exhaust gas of the engine 22.

FIG. 3 schematically illustrates an exhaust gas purifying device 50 that purifies or cleans the exhaust gas of the engine 22. As shown in FIG. 3, the exhaust gas purifying device 50 includes a cylindrical case 52, a cylindrical partition member 54 housed in the case 52 and disposed coaxially with the case 52, a HC adsorbing member 56 disposed in an annular space defined by the inner surface of the case 52 and the outer surface of the partition member 54, and a three-way catalyst (exhaust gas purifying catalyst) 58 provided at the downstream side (the right-hand side in FIG. 3) of the case 52. The partition member 54 has a smaller diameter than the case 52, and defines a first exhaust gas channel that guides the exhaust gas of the engine 22 directly to the three-way catalyst 58. Namely, the interior of the partition member 54 provides the first exhaust gas channel. The HC adsorbing member 56 holds a HC adsorbent, such as zeolite, which adsorbs hydrocarbon (HC) gas as an unburned component in the exhaust gas under a low-temperature environment, and releases the adsorbed HC gas under a high-temperature environment. The case 52 and the partition member 54 define therebetween a second exhaust gas channel through which the exhaust gas is fed to the three-way catalyst 58 while passing through the HC adsorbing member 56. In this embodiment, the three-way catalyst 58 consists of an oxidizing catalyst, such as platinum (Pt) or palladium (Pd), a reducing catalyst, such as rhodium (Rh), a co-catalyst, such as ceria ($CeO_2$), and others. When the three-way catalyst 58 is activated at a high temperature, the oxidizing catalyst contained in the three-way catalyst 58 functions to convert CO and HC contained in the exhaust gas, into water ($H_2O$) and carbon dioxide ($CO_2$), and the reducing catalyst functions to convert NOx contained in the exhaust gas, into nitrogen ($N_2$) and oxygen ($O_2$).

The exhaust gas purifying device 50 constructed as described above is provided with a channel switching valve 59 that is mounted in an opening 54*a* of the partition member 54 and is adapted to be driven by an actuator 60 so as to open and close the opening 54*a*. When the channel switching valve 59 is opened by the actuator 60, the interior of the partition member 54 (i.e., the first exhaust gas channel) provides a main channel of the exhaust gas from the engine 22, and most of the exhaust gas introduced from the combustion chamber of the engine 22 into the exhaust gas purifying device 50 is led or guided directly to the three-way catalyst 58 without passing through the HC adsorbing member 56. When the channel switching valve 59 is closed by the actuator 60, the annular space (the second exhaust gas channel) defined between the inner surface of the case 52 and the outer surface of the partition member 54 provides a main channel of the exhaust gas from the engine 22, and substantially the entire volume of the exhaust gas introduced from the combustion chamber of the engine 22 into the exhaust gas purifying device 50 passes through the HC adsorbing member 56, and is then led to the three-way catalyst 58.

As shown in FIG. 2 and FIG. 3, the actuator 60 of the channel switching valve 59 includes a diaphragm 62 housed in an actuator case 61, an operating rod 63 connected to the diaphragm 62, a spring 64 that urges the diaphragm 62 toward the operating rod 63 in the actuator case 61, and a link mechanism 65 that couples the operating rod 63 with the channel switching valve 59. As shown in FIG. 3, the link mechanism 65 has a link 65*a* that connects the operating rod 63 with a rotary shaft of the channel switching valve 59, and a stopper 65*b* for positioning the channel switching valve 59 in a valve-open position. In operation, the link mechanism 65 converts linear motion of the operating rod 63 into rotary motion, thereby to open and close the channel switching valve 59. The interior of the actuator case 61 is divided or partitioned by the diaphragm 62 into an atmospheric pressure chamber in which the operating rod 63 is placed, and a variable pressure chamber in which the spring 64 is placed. In this case, the atmospheric pressure chamber in the actuator case 61 communicates with the outside of the vehicle, and the pressure in this chamber is always kept at the atmospheric pressure. On the other hand, the variable pressure chamber in the actuator case 61 is connected to an intake pipe (surge tank) 125 of the engine 22, via a vacuum switching valve (which will be called "VSV") 66, a vacuum tank 67, a check valve 68 and a vacuum feed pipe 125*a*, as shown in FIG. 2. When the VSV 66, which consists of, for example, a solenoid-operated valve, is in the OFF state, the VSV 66 communicates a port (not shown) exposed to the atmosphere with the variable pressure chamber of the actuator case 61, so as to keep the pressure in the variable pressure chamber at the atmospheric pressure. When the VSV 66 is in the ON state, the VSV 66 disconnects the port exposed to the atmosphere from the variable pressure chamber of the actuator case 61, and communicates the variable pressure chamber with the intake pipe 125 of the engine 22 via the vacuum tank 67, check valve 68 and the vacuum feed pipe 125*a*.

With the above arrangement, if the VSV 66 is turned on, and a negative pressure produced according to rotation of the crankshaft 26, for example, is introduced into the variable pressure chamber of the actuator case 61 through the vacuum feed pipe 125*a* and others, to lower the pressure in this chamber, the diaphragm 62 is deformed against the bias force of the spring 64 so as to retract or pull the operating rod 63 into the actuator case 61. In this embodiment, when the VSV 66 is turned on, and the diaphragm 62 is deformed under a negative pressure introduced into the variable pressure chamber of the actuator case 62, the channel switching valve 59 closes the opening 54*a* of the partition member 54. If the VSV 66 is turned off so as to keep the pressure in the variable pressure chamber at the atmospheric pressure, no differential pressure (i.e., no difference in pressure) appears between the variable pressure chamber and the atmospheric pressure chamber, and the diaphragm 62 returns to its original, non-deformed condition under the bias force of the spring 64, so that the operating rod 63 moves in a direction opposite to that in which the rod 63 moves when a negative pressure is introduced into the variable pressure chamber. In this embodiment, when the VSV 66 is turned off, and the atmospheric pressure is introduced into the variable pressure chamber of the actuator case 61, causing no deformation of the diaphragm 62, the channel switching valve 59 opens the opening 54a of the partition member 54. Thus, in this embodiment, it is possible to switch or change the main channel of the exhaust gas from the engine 22, by changing the pressure in the variable pressure chamber of the actuator case 61, and converting the linear motion of the operating rod 63 into the rotary motion by means of the link mechanism 65 so as to open or close the channel switching valve 59. The VSV 66 is normally held in the OFF state, and the main channel of the exhaust gas from the engine 22 is basically provided by the first exhaust gas channel defined in the partition member 54. The vacuum tank 67 is a gastight enclosure or container having a specified volume. In operation, air in the vacuum tank 67 is sucked or drawn into the intake pipe via the vacuum feed pipe 125a, so that the pressure in the vacuum tank 67 is reduced. In this manner, a negative pressure can be accumulated in the vacuum tank 67. The vacuum tank 67 is provided with a vacuum sensor 69 for detecting the pressure (negative pressure) in the vacuum tank 67. The check valve 68 permits flow of air from the vacuum tank 67 into the vacuum feed pipe 125a, but restricts or inhibits flow of air from the vacuum feed pipe 125a into the vacuum tank 67.

Referring again to FIG. 1, the power distribution/integration mechanism 30 includes a sun gear 30a in the form of an external gear, a ring gear 30b in the form of an internal gear disposed concentrically with the sun gear 30a, two or more pinion gears 30c that mesh with the sun gear 30a and also mesh with the ring gear 30b, and a carrier 30d that holds the pinion gears 30c such that the pinion gears 30c can rotate about themselves and rotate about the center of the carrier 30d. Thus, the power distribution/integration mechanism 30 is constructed as a planetary gear mechanism that performs differential actions, using the sun gear 30a, ring gear 30b and the carrier 30d as rotating elements. In this case, the crankshaft of the engine 22 is connected to the carrier 30d of the power distribution/integration mechanism 30, and the motor MG1 is connected to the sun gear 30a, while the motor MG2 is connected to the ring gear 30b via a ring gear shaft 27 as a rotatable driveshaft. When the motor MG1 operates as a generator, the power distribution/integration mechanism 30 distributes power transmitted from the engine 22 to the carrier 30d, to the sun gear 30a side and the ring gear 30b side, according to the gear ratio thereof. When the motor MG1 operates as an electric motor, the power distribution/integration mechanism 30 integrates or combines power transmitted from the engine 22 to the carrier 30d and power transmitted from the motor MG1 to the sun gear 30a, and provides the combined power to the ring gear 30b side. The power received by the ring gear 30b is transmitted to vehicle wheels 29a, 29b as driving wheels, via the ring gear shaft 27 and a differential gear 28.

Each of the motors MG1, MG2 is a known synchronous generator-motor that is operable as a motor and also operable as a generator. The motors MG1, MG2 supply and receive electric power to and from a battery 36 via inverters 32, 34, respectively, and driving of each of the motors MG1, MG2 is controlled by an electronic control unit for motors (which will be called "motor ECU") 35. The motor ECU 35 receives signals needed for controlling driving of the motors MG1, MG2, for example, signals from rotational position detection sensors (not shown) that detect the rotational positions of rotors of the motors MG1, MG2, and phase currents applied to the motors MG1, MG2, which are detected by current sensors (not shown). Also, the motor ECU 35 generates switching control signals to the inverters 34, 35. The motor ECU 35, which communicates with the hybrid ECU 40, controls the motors MG1, MG2 according to a control signal from the hybrid ECU 40, and sends data relating to the operating conditions of the motors MG1, MG2 to the hybrid ECU 40 as needed.

The battery 36 is managed or controlled by an electronic control unit for the battery (which will be called "battery ECU") 37. The battery ECU 37 receives signals needed for managing the battery 36, for example, a terminal-to-terminal voltage from a voltage sensor (not shown) installed between the terminals of the battery 36, charging/discharging current from a current sensor mounted in a power line connected to the output terminal of the battery 36, and a battery temperature from a temperature sensor (not shown) attached to the battery 36. The battery ECU 37 transmits data relating to the conditions of the battery 36, via communications, to the hybrid ECU 40 and others, as needed. Furthermore, in order to manage the battery 36, the battery ECU 37 calculates the remaining capacity SOC based on the total value of the charging/discharging current detected by the current sensor, calculates the required power Pb* for charging/discharging of the battery 36, based on the remaining capacity SOC, and calculates the input limit Win as a permissible charging power, i.e., electric power permitted to be received by the battery 36 for charging thereof, and the output limit Wout as a permissible discharging power, i.e., electric power permitted to be discharged from the battery 36, based on the remaining capacity SOC and the battery temperature Tb. The input and output limits Win, Wout of the battery 36 can be set by setting the basic values of the input and output limits Win, Wout based on the battery temperature Tb, setting a correction factor for the output limit and a correction factor for the input limit based on the remaining capacity (SOC) of the battery 36, and multiplying the basic values of the input and output limits Win, Wout by the respective correction factors.

The hybrid ECU 40 is configured as a microprocessor having a CPU 40a as a main component, and includes a ROM 40b that stores control programs, RAM 40c that temporarily stores data, timer 40d that performs a timing or clocking operation in response to a timing command, input and output ports and communication ports, and so forth, as well as the CPU 40a. The hybrid ECU 40 receives, via the input port, a shift position from a shift position sensor 42 that detects the position to which a shift lever 41 is operated, an accelerator pedal travel from an accelerator pedal position sensor 44 that detects the amount of depression of an accelerator pedal 43, a brake pedal travel from a brake pedal position sensor 46 that detects the amount of depression of a brake pedal 45, a vehicle speed from a vehicle speed sensor 47, an atmospheric pressure Patm from an atmospheric pressure sensor 48, a pressure Ptk accumulated in the vacuum tank 67, which is received from the vacuum sensor 69, and so forth. Also, the hybrid ECU 40 generates a drive signal to the VSV 66, via the output port. The hybrid ECU 40 sends and receives various control signals and data to and from the engine ECU 24, motor ECU 35, etc., as described above.

In the hybrid vehicle 20 of this embodiment constructed as described above, the required torque to be delivered to the driveshaft is calculated based on the accelerator pedal travel corresponding to the amount of depression of the accelerator pedal 43 by the driver, and the vehicle speed, and the engine 22, motor MG1 and the motor MG2 are controlled so that the required power based on the required torque is provided to the ring gear shaft 27 as the driveshaft. The engine 22, motor MG1 and the motor MG2 are operable in several operation control modes. The operation control modes include a torque conversion operating mode in which the operation of the engine 22 is controlled so that power commensurate with the required power is generated from the engine 22, while driving of the motor MG1 and motor MG2 is controlled so that all of the power generated from the engine 22 is subjected to torque conversion by the power distribution/integration mechanism 30, motor MG1 and the motor MG2, and is then delivered to the ring gear shaft 27. The operating control modes also include a charging/discharging operating mode in which the operation of the engine 22 is controlled so that power commensurate with the sum of the required power and electric power needed for charging/discharging of the battery 36 is generated from the engine 22, while driving of the motor MG1 and motor MG2 is controlled so that all or part of the power generated from the engine 22 is subjected to torque conversion by the power distribution/integration mechanism 30 and the motor MG1 and motor MG2, along with charging or discharging of the battery 36, to cause the required power to be delivered to the ring gear shaft 27. The operating control modes further include a motor operating mode in which the operation of the engine 22 is stopped, and the motor MG2 is controlled so that power commensurate with the required power is delivered from the motor MG2 to the ring gear shaft 27.

In the hybrid vehicle 20 of this embodiment, when certain conditions are satisfied while the engine 22 and the motors MG1, MG2 are operating in the torque conversion operating mode or charging/discharging operating mode, the engine 22 is intermittently operated, namely, the engine 22 is automatically stopped and started. In this embodiment, if the coolant temperature of the engine 22 is equal to or higher than a first specified temperature (e.g., 55° C.-65° C.), and the remaining capacity (SOC) of the battery 36 is within a controlled region, while the required vehicle power set in accordance with the amount of depression of the accelerator pedal 43 is less than a first specified value (e.g., 2 kW-10 kW), automatic stopping conditions under which the engine 22 is automatically stopped are satisfied, and the engine 22 is automatically stopped, causing a transition from the torque conversion operating mode or charging/discharging operating mode to the motor operating mode. If, under the motor operating mode, the coolant temperature of the engine 22 is lower than a second specified temperature (e.g., 45-55° C.) that is lower than the first specified temperature, or the required vehicle power set in accordance with the amount of depression of the accelerator pedal 43 becomes equal to or greater than a second specified value (e.g., 4-15 kW) that is larger than the first specified value, or the remaining capacity (SOC) of the battery 36 falls below the controlled region, automatic starting conditions under which the engine 22 is automatically started are satisfied, and the engine 22 that has been stopped is started again.

In the hybrid vehicle 20 of this embodiment, if the coolant temperature of the engine 22 is lower than, for example, the above-mentioned second specified temperature when a start switch (ignition switch) (not shown) is turned on so as to start running of the vehicle, the engine 22 is started, and a warm-up operation is carried out. When the warm-up operation (cold-start of the engine 22) is executed, the above-described VSV 66 is turned on prior to start-up of the engine 22, so that the opening 54a of the partition member 54 of the exhaust gas purifying device 50 is closed by the channel switching valve 59, and the exhaust gas emitted from the engine 22 mainly passes through the annual space (the second exhaust gas channel) defined by the inner surface of the case 52 and the outer surface of the partition member 54. As a result, upon start-up of the engine 22, the exhaust gas introduced from the combustion chamber into the exhaust gas purifying device 50 is fed to the three-way catalyst 58 after passing through the HC adsorbing member 56, so that HC as an unburned component that is likely to be produced upon start-up (in particular, cold start) of the engine is adsorbed by the HC adsorbing member 56. It is thus possible to more reliably prevent HC from being discharged to the outside, even where the three-way catalyst 58 has not been fully activated.

Figure 4:
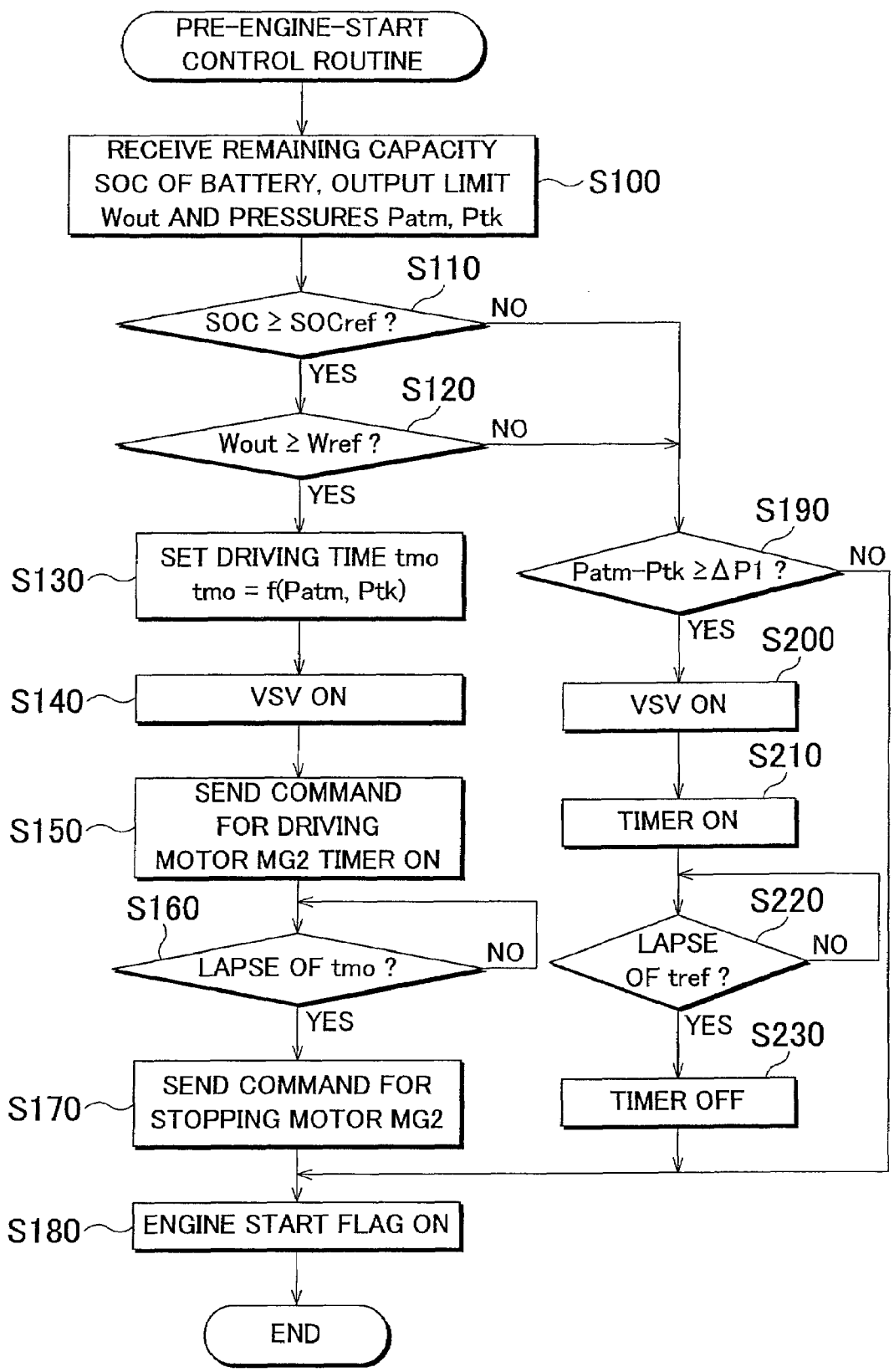
FIG. 4 is a flowchart illustrating one example of pre-engine-start control routine executed by a hybrid ECU 40 of the embodiment of FIG. 1 of the invention.

Next, a procedure for switching the main channel of the exhaust gas by means of the channel switching valve 59 prior to start-up of the engine 22, in the hybrid vehicle 20 of this embodiment, will be specifically described. FIG. 4 is a flowchart illustrating one example of a pre-engine-start control routine executed by the hybrid ECU 40 of this embodiment. This routine is executed by the hybrid ECU 40 in the case where the coolant temperature detected by the water temperature sensor 142 is lower than the above-indicated second specified temperature when the start switch of the hybrid vehicle 20 is turned on by the driver.

Upon start of execution of the routine of FIG. 4, the CPU 40a of the hybrid ECU 40 receives data necessary to control the hybrid vehicle 20, more specifically, receives the remaining capacity SOC and the output limit Wout of the battery 36 from the battery ECU 37, pressure Patm from the atmospheric pressure sensor 48, and the pressure Ptk from the vacuum sensor 69 (step S100). Then, the CPU 40a determines whether the remaining capacity SOC of the battery 36 is equal to or larger than a predetermined threshold value SOCref (step S110). If the remaining capacity SOC is equal to or larger than the threshold value SOCref, the CPU 40a determines whether the output limit Wout of the battery 36 is equal to or greater than a predetermined threshold value Wref (step S120). The threshold value SOCref and threshold value Wref are determined through experiments and analyses in view of the performance of the battery 36, the environment in which the hybrid vehicle 20 is used, characteristics of the motor MG2, and so forth. If the output limit Wout is equal to or greater than the threshold value Wref, it is determined that the battery 36 is in a condition that permits motoring of the engine 22, i.e., forced rotation of the crankshaft 26 of the engine 22 by the motor MG2. In this case, the driving time of the motor MG2 (the motoring time) tmo for which the engine 22 is motor-driven by the motor MG2 is set (step S130). Namely, in this embodiment, when sufficient electric power can be generated from the battery 36, the engine 22 is motor-driven by the motor MG2 so that a negative pressure builds up in the intake pipe 125, and the negative pressure produced through the motoring is introduced into the variable pressure chamber of the actuator 60 so as to close the channel switching valve 59. As a result, almost the entire volume of the exhaust gas introduced from the combustion chamber of the engine 22 into the exhaust gas purifying device 50 is fed to the three-way catalyst 58 after passing through the HC adsorbing member 56. In step S130, therefore, the driving time tmo of the motor MG2, i.e., the length of time for which the motoring is carried out, is set so that the channel switching valve 59 switches from the open state to the closed state as quickly as possible while the amount of electric power consumed by the motor MG2 during the motoring is controlled to the required minimum level. In this embodiment, the relationship among the atmospheric pressure Patm, pressure Ptk accumulated in the vacuum tank 67 and the driving time tmo is predetermined and stored in the ROM 40b as a map for setting the driving time, and the driving time corresponding to the atmospheric pressure Patm and pressure Ptk entered in step S100 is derived from the map and set as the driving time tmo. In this embodiment, the map for setting the driving time is created on the assumption that the engine 22 is motor-driven at a constant speed equivalent to the idling speed, such that the driving time tmo is reduced as a pressure difference obtained by subtracting the pressure Ptk accumulated in the vacuum tank 67 from the atmospheric pressure Patm is larger.

Once the driving time tmo is set, the VSV 66 is turned on (step S140), and a command for driving the motor MG2 is transmitted to the motor ECU 35 while the timer 40d is turned on (step S150). In step 150, the command for driving the motor MG2, for example, a torque command for causing the motor MG2 to rotate the engine 22 at a speed equivalent to the idling speed through motoring, is transmitted to the motor ECU 35, and the motor ECU 35 that receives the driving command for the motor MG2 performs switching control of a switching device of the inverter 34 so as to drive the motor MG2 according to the driving command. Then, the CPU 40a compares the time measured by the timer 40d with the driving time tmo set in step S130, and determines whether the driving time tmo has elapsed from start of the motoring (step S160). Upon a lapse of the driving time tmo from start of motoring, the CPU 40a sends a command for stopping the motor MG2 to the motor ECU 35, and turns off the timer 40d (step S170). As a result, the opening 54a of the partition member 54 is closed by the channel switching valve 59, so that the exhaust gas introduced from the combustion chamber of the engine 22 into the exhaust gas purifying device 50 can be fed to the three-way catalyst 58 via the HC adsorbing member 56. Thus, an engine start flag is set ON (step S180), and the routine of FIG. 4 ends. Once the engine start flag is set ON, the hybrid ECU 40 executes a driving control routine (not shown) for start-up of the engine. The driving control routine for start-up of the engine is a process of causing the motor MG1 to crank the engine 22 so as to start the engine 22, and controlling the motor MG2 to deliver torque determined based on the required torque to the ring gear shaft 27 as needed while cancelling the torque applied to the ring gear shaft 27 through cranking of the engine 22. Once the engine 22 is started in this manner, a warm-up operation of the engine 22 is performed until certain conditions are satisfied, and the VSV 66 is turned off when the three-way catalyst 58 is regarded as having been fully activated through the warm-up operation. Thus, HC as an unburned component emitted from the combustion chamber during start-up and warm-up operation of the engine 22 is adsorbed and retained by the HC adsorbing member 56. When the VSV 66 is placed in the OFF state, most of the exhaust gas from the combustion chamber is fed to the three-way catalyst 58 via the interior of the partition member 54 (the first exhaust gas channel), but a part of the exhaust gas is fed to the HC adsorbing member 56 (the second exhaust gas channel) where the temperature of the HC adsorbing member 56 gradually increases. As the temperature increases, the adsorbed HC is released from the HC adsorbing member 56, and is fed to the three-way catalyst 58 where the HC is treated (i.e., converted into harmless substances) by the three-way catalyst 58 that has been activated.

If, on the other hand, a negative decision (NO) is made in step S110 or S120, namely, if it is determined that the battery 36 is not in a condition that permits motoring, i.e., forced rotation of the crankshaft 26 of the engine 22 by the motor MG2, it is determined whether a pressure difference obtained by subtracting the pressure Ptk accumulated in the vacuum tank 67 from the atmospheric pressure Patm is equal to or larger than a predetermined threshold value ΔP1 (step 190). The threshold value ΔP1 is determined in view of characteristics of the actuator 60 (diaphragm 62), operating characteristics of the channel switching valve 59, and so forth. If it is determined in step S190 that the pressure difference is equal to or larger than the threshold value ΔP1, the pressure Ptk of air in the vacuum tank 67 is sufficiently smaller than the atmospheric pressure. In this case, if the VSV 66 is turned on to allow communication between the vacuum tank 67 and the variable pressure chamber of the actuator 60, the pressure difference from the atmospheric pressure Patm makes it possible to deform the diaphragm 62, and thereby switch the channel switching valve 59 from the open state to the closed state. If an affirmative decision (YES) is made in step S190, therefore, the VSV 66 is turned on (step S200), and the timer 40d is turned on (step S210). By comparing the time measured by the timer 40d with a predetermined standby time tref, it is determined whether the standby time tref has elapsed since the VSV 66 is turned on and a negative pressure is introduced from the vacuum tank 67 into the variable pressure chamber of the actuator 60 (step S220). The standby time tref is also determined in view of characteristics of the actuator 60 (diaphragm 62), operating characteristics of the channel switching valve 59, and so forth. Then, the timer 40d is turned off upon a lapse of the standby time tref from turn-on of the VSV 66 (step S230), and the engine start flag is set ON (step S180), which is followed by the end of this routine. Thus, even in the case where the battery 36 is not in a condition that permits motoring by the motor MG2, if a negative pressure having a sufficiently reduced level is stored in the vacuum tank 67, the negative pressure is introduced from the vacuum tank 67 into the variable pressure chamber of the actuator 60, to cause the channel switching valve 59 to close the opening 54a of the partition member 54, so that the exhaust gas introduced from the combustion chamber of the engine 22 into the exhaust gas purifying device 50 can be fed to the three-way catalyst 58 via the HC adsorbing member 56.

When a negative decision (NO) is made in step S190, the pressure difference between the atmospheric pressure Patm and the pressure Ptk accumulated in the vacuum tank 67 is small, thus making it difficult to deform the diaphragm 62 and switch the channel switching valve 59 from the open state to the closed state by utilizing the pressure difference. In this case, the engine start flag is immediately set ON (step S180), and the routine of FIG. 4 ends. Accordingly, when a negative decision (NO) is made in step S190, it is not possible to close the opening 54a of the partition member 54 of the exhaust gas purifying device 50, and feed the exhaust gas introduced from the combustion chamber of the engine 22 into the exhaust gas purifying device 50 to the three-way catalyst 58 via the HC adsorbing member 56, which may result in discharge of HC to the outside without being sufficiently cleaned. Thus, in the hybrid vehicle 20 of this embodiment, the hybrid ECU 40 executes a routine as shown in FIG. 5 for determining whether it is necessary to produce a negative pressure, so that the channel switching valve 59 can be actuated by using a negative pressure accumulated in the vacuum tank 67 as much as possible, even in the case where the battery 36 is not in a condition that permits motoring of the engine by the motor MG2.

Figure 5:
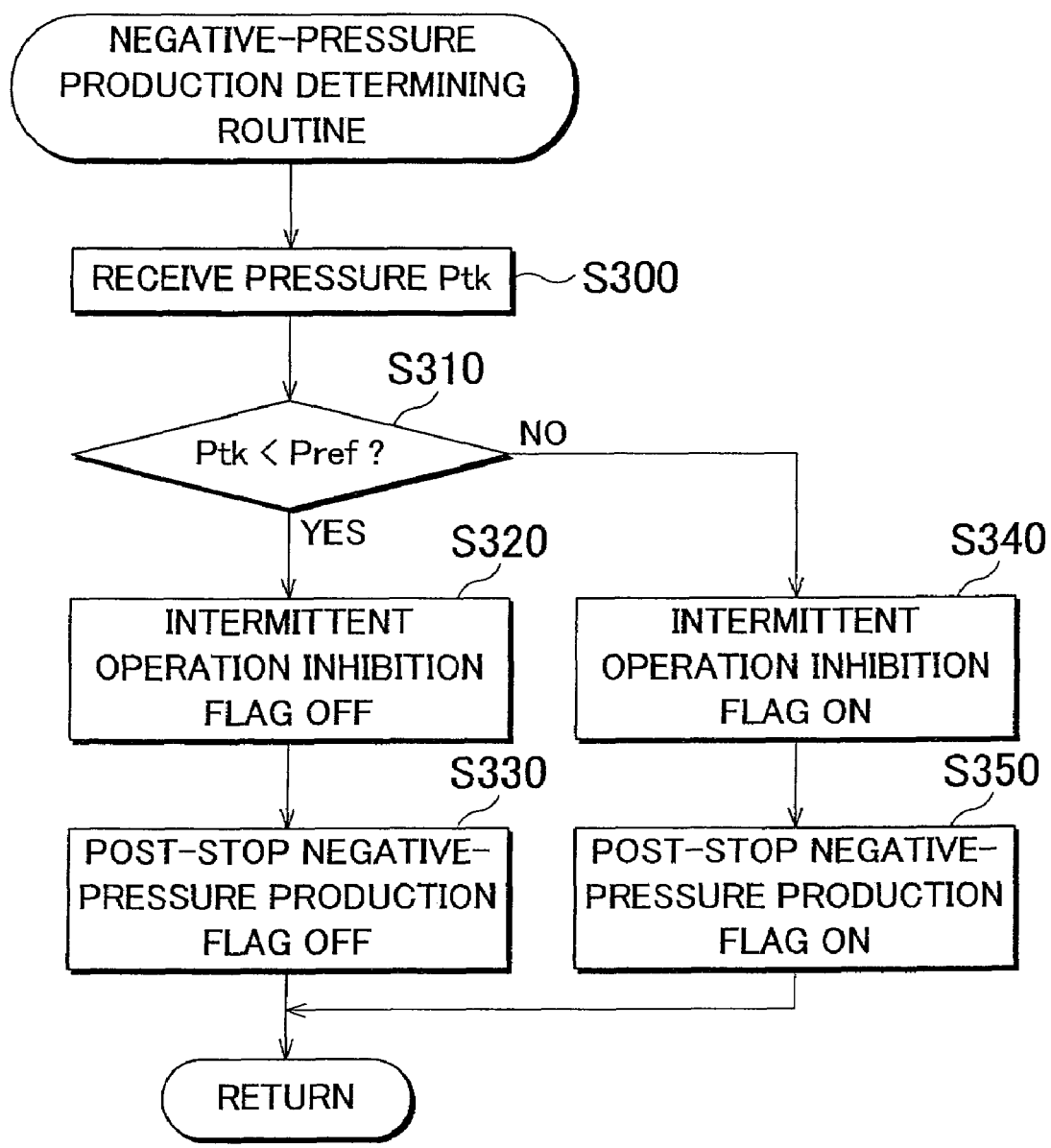
FIG. 5 is a flowchart illustrating one example of routine for determining whether it is necessary to produce a negative pressure, which routine is executed by the hybrid ECU 40 of the embodiment of FIG. 1 of the invention.

The negative-pressure production determining routine of FIG. 5 is repeatedly executed at certain time intervals, during a period between turn-on of the start switch of the hybrid vehicle 20 by the driver and turn-off of the start switch. Upon start of execution of the negative-pressure production determining routine, the CPU 40a of the hybrid ECU 40 receives a pressure Ptk from the vacuum sensor 69 (step S300). Then, the CPU 40a determines whether the pressure Ptk received in step S300 is lower than a predetermined threshold value Pref (step S310). If the pressure Ptk is lower than the threshold value Pref, an intermittent operation inhibition flag, which is set ON when intermittent operation of the engine 22 is to be inhibited, is set OFF (step S320), and a post-stop negative-pressure production flag is set OFF (step S330). The post-stop negative-pressure production flag is set ON when a negative pressure is to be accumulated in the vacuum tank 67 by continuing the operation (idling) of the engine 22 for a certain period of time after the start switch is turned off by the driver. If the pressure Ptk is equal to or higher than the threshold value Pref, the intermittent operation inhibition flag is set ON (step S340), and the post-stop negative-pressure production flag is set ON (step S350).

In the above manner, the intermittent operation inhibition flag is set ON depending on the value of the pressure Ptk accumulated in the vacuum tank 67 (step S340), and the intermittent operation of the engine 22 is inhibited, so that the engine 22 continues operating (for example, idling) without being stopped even if the automatic stopping conditions of the engine 22 are satisfied. It is thus possible to suck air in the vacuum tank 67 to reduce the pressure in the tank 67 through the operation (idling) of the engine 22 after the automatic stopping conditions are satisfied, and thereby accumulate a negative pressure of a sufficiently reduced level in the vacuum tank 67. Also, the post-stop negative-pressure production flag is set ON depending on the value of the pressure Ptk accumulated in the vacuum tank 67 (step S350), so that the operation (idling) of the engine 22 continues for a certain period of time even after the start switch is turned off by the driver. It is thus possible to suck air in the vacuum tank 67 and reduce the pressure in the tank 67 through the operation (idling) of the engine 22 after turn-off of the start switch, and thereby accumulate a negative pressure of a sufficiently reduced level in the vacuum tank 67.

As explained above, in the hybrid vehicle 20 of this embodiment, a negative pressure may be produced by driving the motor MG2 using electric power from the battery 36 to effect motoring of the engine 22 for forced rotation of the engine 22, and the negative pressure thus produced may be introduced into the variable pressure chamber of the actuator 60 via the vacuum tank 67. Also, in the hybrid vehicle 20, a negative pressure produced through rotation of the engine 22 may be accumulated in the vacuum tank 67 connected to the intake pipe 125, and the negative pressure thus accumulated in the vacuum tank 67 may be introduced into the variable pressure chamber of the actuator 60. Accordingly, in the hybrid vehicle 20, the negative pressure used for switching the channel of the exhaust gas from the engine 22 between the first exhaust gas channel defined by the partition member 54 and the second exhaust gas channel containing the HC adsorbing member 56 can be selected from the negative pressure produced through motoring of the engine 22 by the motor MG2, and the negative pressure accumulated in the vacuum tank 67, depending on the conditions (the remaining capacity SOC and the output limit Wout) of the battery 36 and the pressure accumulation state (the value of the pressure Ptk) of the vacuum tank 67. In this manner, a negative pressure is favorably provided with reliability, and the negative pressure is prevented from failing to be introduced into the variable pressure chamber of the actuator 60. Consequently, the channel of the exhaust gas is more appropriately switched between the first exhaust gas channel defined by the partition member 54 and the second exhaust gas channel containing the HC adsorbing member 56, so that discharge of HC in the exhaust gas to the outside can be suppressed or prevented with improved reliability.

Namely, according to the pre-engine-start control routine of this embodiment, if the battery 36 is in a condition that permits motoring of the engine 22 by the motor MG2, prior to start-up of the engine 22, a negative pressure is favorably produced through the motoring, so that the channel of the exhaust gas can be quickly switched from the first exhaust gas channel defined by the partition member 54 to the second exhaust gas channel containing the HC adsorbing member 56. Also, even in the case where the battery 36 is not in a condition that permits motoring of the engine 22 by the motor MG2, if the pressure accumulation state of the vacuum tank 67 satisfies the predetermined condition to ensure a negative pressure of a sufficiently reduced level (step S190), the exhaust gas channel can be switched, using the negative pressure accumulated in the vacuum tank 67, from the first exhaust gas channel defined by the partition member 54 to the second exhaust gas channel containing the HC adsorbing member 56. Accordingly, in the hybrid vehicle 20, HC as an unburned component that tends to appear during starting (in particular, cold-start) of the engine 22 is more likely to be adsorbed by the HC adsorbing member 56, so that discharge of HC to the outside of the vehicle can be suppressed or prevented with improved reliability.

When the battery 36 is in a condition that permits motoring of the engine 22 by the motor MG2, prior to start-up of the engine 22, the driving time tmo of the motor MG2 is set based on the pressure Ptk accumulated in the vacuum tank 67 and the atmospheric pressure Patm (step S130), so that the motoring time, i.e., the length of time for which motoring of the engine 22 is effected, can be more appropriately set. When the driving time tmo (motoring time) is set in step S130 of FIG. 4, the condition(s) of the battery 36, such as the remaining capacity SOC, as well as the pressure Ptk and the atmospheric pressure Patm, may be taken into consideration. Namely, motoring may be performed for a longer time than the required driving time tmo, depending on the state of charge of the battery 36, so that the pressure in the vacuum tank 67 is further reduced (a negative pressure having a further reduced level is accumulated in the vacuum tank 67). Thus, when the driving time tmo is set in view of, for example, the remaining capacity SOC, as well as the pressure Ptk and the atmospheric pressure Patm, the map for setting the driving time may be created so as to define the relationship between the atmospheric pressure Patm, pressure Ptk and the remaining capacity SOC, and the driving time tmo, such that the driving time tmo is basically increased as the remaining capacity SOC is larger.

Also, since the motor MG2 of this embodiment is able to provide power to the ring gear shaft 27 as the driveshaft, it is possible in the hybrid vehicle 20 to generate power solely from the motor MG2 to the ring gear shaft 27 while stopping the operation of the engine 22 as needed. Accordingly, if the intermittent operation of the engine 22 is inhibited when the pressure accumulation state of the vacuum tank 67 does not satisfy the predetermined condition during operation of the engine 22 (steps S310, S340 in FIG. 5), a negative pressure can be produced by operating (e.g., idling) the engine 22 and the negative pressure thus produced can be stored in the vacuum tank 67 when the engine 22 should be stopped under the intermittent operation while power is generated solely from the motor MG2 to the ring gear shaft 27. Furthermore, in the hybrid vehicle 20 of this embodiment, when the pressure accumulation state of the vacuum tank 67 does not satisfy the predetermined condition when the start switch is turned off by the driver, the post-stop negative-pressure production flag is set ON (step S350 in FIG. 5). Therefore, even after the start switch is turned off, the operation (idling) of the engine 22 continues for a certain period of time, so that a negative pressure of a sufficiently reduced level can be surely provided in the vacuum tank 67. Accordingly, even if the motor MG is not able to effect motoring of the engine 22 when the engine 22 is started next time, the negative pressure accumulated in the vacuum tank 67 may be used for switching the channel of the exhaust gas from the first exhaust gas channel defined by the partition member 54 to the second exhaust gas channel containing the HC adsorbing member 56 with improved reliability. However, instead of continuing the operation (idling) of the engine 22 after the start switch is turned OFF, the engine 22 may be stopped, and the motor MG2 may be driven to effect motoring of the engine 22, depending on the conditions of the battery 36, so that a sufficiently reduced pressure can be developed in the vacuum tank 67.

Figure 6:
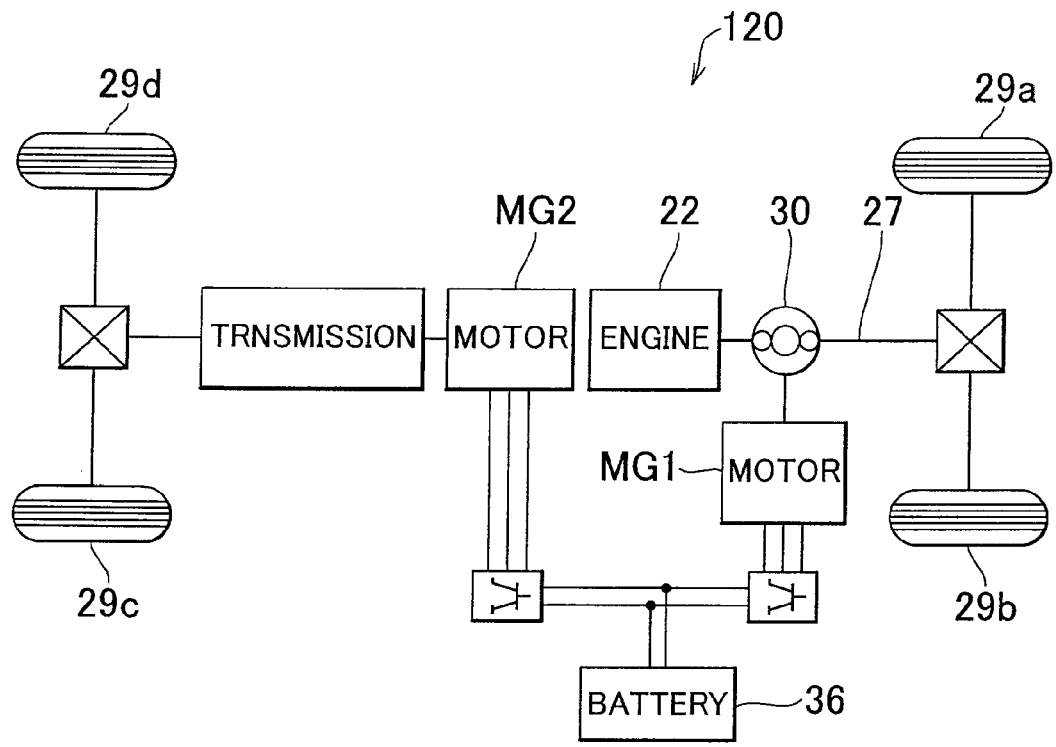
FIG. 6 is a schematic view showing the construction of a hybrid vehicle 120 as a modified example.
Figure 7:
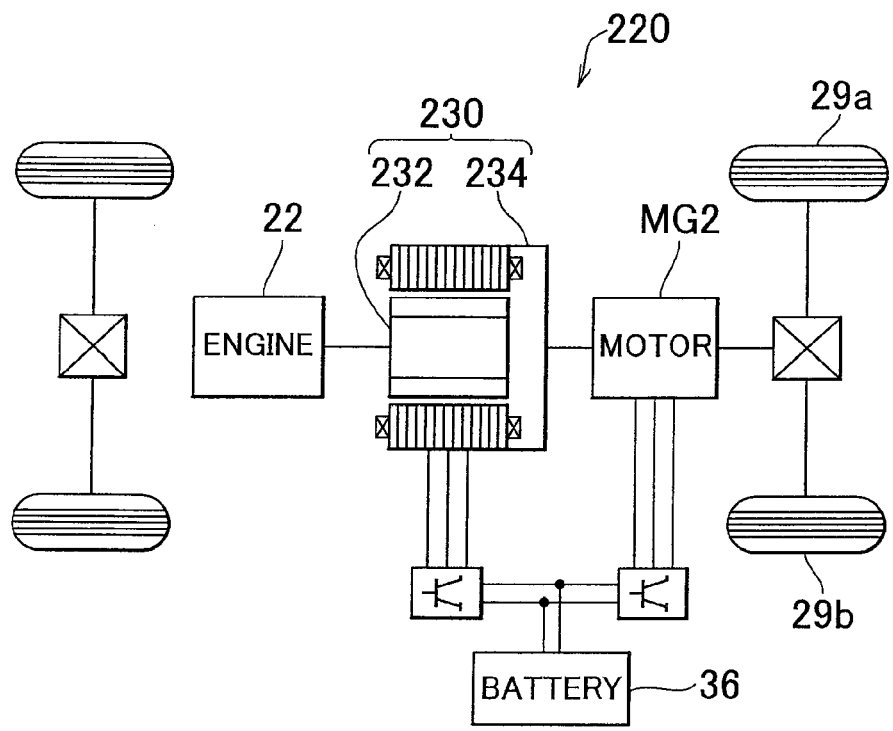
FIG. 7 is a schematic view showing the construction of a hybrid vehicle 220 as another modified example.

While the hybrid vehicle 20 of this embodiment is of the type that provides the power of the motor MG2 to the axles connected to the ring gear shaft 27, the invention is not limited to this type of vehicle, but may be applied to other types of hybrid vehicles. For example, the present invention may be applied to a hybrid vehicle 120 as a modified example shown in FIG. 6, in which the power of the motor MG2 is provided to axles (i.e., axles connected to wheels 29c, 29d shown in FIG. 6), rather than the axles (i.e., axles connected to the wheels 29a, 29b) connected to the ring gear shaft 27. Also, while the hybrid vehicle 20 of this embodiment is of the type in which the power of the engine 22 is transmitted to the ring gear shaft 27 as the driveshaft or driving axle connected to the wheels 29a, 29b, via the power distribution/integration mechanism 30, the invention is not limited to this type of vehicle, but may be applied to other types of hybrid vehicles. For example, the present invention may be applied to a hybrid vehicle 220 as a modified example shown in FIG. 7, which is provide with a paired rotor motor 230 having an inner rotor 232 connected to the crankshaft of the engine 22, and an outer rotor 234 connected to the driveshaft through which power is provided to the wheels 29a, 29b. In operation, the paired rotor motor 230 transmit a part of the power of the engine to the driveshaft, while converting the remaining power into electric power.

The correlation between principal elements of the illustrated embodiment and principal elements of the present invention will be hereinafter explained. In this embodiment, the engine 22 may be regarded as "internal combustion engine", the motor MG2 operable to effect motoring of the engine 22, or forced rotation of the engine 22, may be regarded as "electric motoring mechanism", the battery 36 operable to supply electric power to the motor MG2 may be regarded as "electric storage device", the channel defined by the partition member 54 for guiding the exhaust gas from the engine 22 directly to the three-way catalyst 58 may be regarded as "first exhaust gas channel", the space defined by the case 52 and the partition member 54, in which the HC adsorbing member 56 is disposed, may be regarded as "second exhaust gas channel", the channel switching valve 59 and actuator 60 operable to switch the channel of the exhaust gas of the engine 22 between the first exhaust gas channel and the second exhaust gas channel by using a negative pressure may be regarded as "channel switching mechanism", the vacuum tank 67 which is connected to the intake pipe 125 of the engine 22 and which allows a negative pressure produced through rotation of the engine 22 to be accumulated therein may be regarded as "pressure accumulator", the VSV 66 that selectively permits and inhibits introduction of a negative pressure from the vacuum tank 67 into the actuator 60 may be regarded as "negative-pressure introducing/releasing mechanism", and a combination of the hybrid ECU 40 and motor ECU 35, which controls the motor MG2 and the VSV 66 based on the conditions of the battery 36 and the pressure accumulation state of the vacuum tank 67 according to the pre-engine-start control routine of FIG. 4 may be regarded as "controller". Also, the power distribution/integration mechanism 30 and motor MG1 connected to the crankshaft 26 of the engine 22 and the ring gear shaft 27 as the driveshaft may be regarded as "electric-power/motive-power input/output mechanism", the motor MG1 may be regarded as "generator-motor", and the power distribution/integration mechanism 30 may be regarded as "three-axes-type power input/output mechanism".

When the electric storage device is in a condition that permits motoring by the electric motoring mechanism, prior to start-up of the internal combustion engine, the controller may control the electric motoring mechanism and the negative-pressure introducing/releasing mechanism so as to effect motoring by the electric motoring mechanism and thereby switch the channel of the exhaust gas from the first exhaust gas channel to the second exhaust gas channel. When the electric storage device is not in a condition that permits motoring by the electric motoring mechanism, prior to start-up of the engine, and the pressure accumulation state of the pressure accumulator satisfies a predetermined condition, the controller may control the electric motoring mechanism and the negative-pressure introducing/releasing mechanism so as to switch the channel of the exhaust gas from the first exhaust gas channel to the second exhaust gas channel by using only the negative pressure accumulated in the pressure accumulator, without effecting motoring by the electric motoring mechanism. Namely, if the electric storage device is in a condition that permits motoring of the internal combustion engine by the electric motoring mechanism, prior to start-up of the engine, a negative pressure can be favorably produced through the motoring, and the channel of the exhaust gas can be quickly switched from the first exhaust gas channel to the second exhaust gas channel. Even in the case where the electric storage device is not in a condition that permits motoring of the internal combustion engine by the electric motoring mechanism, if the pressure accumulation state of the pressure accumulator satisfies the predetermined condition, to ensure a negative pressure having a sufficiently reduced level, the channel of the exhaust gas can be switched from the first exhaust gas channel to the second exhaust gas channel, using the negative pressure accumulated in the pressure accumulator. In this power output system, therefore, an unburned component that tends to be produced during starting of the engine is adsorbed, with improved reliability, by the unburned component adsorber (e.g., the HC adsorbing member 56), so that discharge of the unburned component to the outside can be suppressed or prevented with improved reliability.

When the electric storage device is in a condition that permits motoring by the electric motoring mechanism, prior to start-up of the internal combustion engine, the controller may set a period of time for which motoring is effected by the electric motoring mechanism, based on the pressure accumulated in the pressure accumulator and the atmospheric pressure, and may control the electric motoring mechanism so as to effect the motoring for the set period of time. Thus, the motoring time for which the engine is motor-driven by the electric motoring mechanism can be more appropriately set or determined.

When the electric storage device is in a condition that permits motoring by the electric motoring mechanism, prior to start-up of the internal combustion engine, the controller may set the period of time for which motoring is effected by the electric motoring mechanism, based on the pressure accumulated in the pressure accumulator, the atmospheric pressure, and a condition of the electric storage device. Thus, if the motoring time is set in view of the condition of the electric storage device as well as the pressure in the pressure accumulator and the atmospheric pressure, the motoring may be carried out for a longer period of time than the required motoring time (set only based on the pressure difference), depending on the storage condition (e.g., the remaining capacity) of the electric storage device, so that the pressure in the pressure accumulator can be reduced to a further lowered level (i.e., so that a further reduced pressure is accumulated in the pressure accumulator).

The electric motoring mechanism may be an electric motor operable to effect motoring for forced rotation of the internal combustion engine and also operable to provide power to the driveshaft, and an intermittent operation of the internal combustion engine may be inhibited when the pressure accumulation state of the pressure accumulator does not satisfy a predetermined condition during operation of the engine. If the electric motoring mechanism is an electric motor operable to provide power to the driveshaft, the power may be delivered solely from the electric motor to the driveshaft while the operation of the internal combustion engine is stopped as needed. If the intermittent operation of the internal combustion engine is inhibited when the pressure accumulation state of the pressure accumulator does not satisfy the predetermined condition during operation of the engine, a negative pressure can be produced by operating (e.g., idling) the engine and the produced negative pressure can be accumulated in the pressure accumulator when the engine is to be stopped under the intermittent operation with the power delivered solely from the electric motor to the driveshaft.

Further, in the power output system of the present invention, when the pressure accumulation state of the pressure accumulator does not satisfy the predetermined condition when a stop command is generated to the power output system, idling of the internal combustion engine may be performed or motoring by the electric motoring mechanism may be performed so that the pressure accumulation state of the pressure accumulator satisfies at least the predetermined condition. In this manner, a negative pressure having a sufficiently reduced level is surely provided in the pressure accumulator, thus making it possible to more reliably switch the channel of the exhaust gas from the first exhaust gas channel to the second exhaust gas channel, using the negative pressure accumulated in the pressure accumulator, even if the electric motoring mechanism cannot perform motoring of the engine when the engine is started next time.

Also, the power output system of the present invention may be further provided with an electric-power/motive-power input/output mechanism connected to the driveshaft and an engine shaft (crankshaft) of the internal combustion engine and adapted to receive and deliver electric power and motive power so as to provide at least a part of the power of the engine to the driveshaft and supply and receive electric power to and from the electric storage device. In this case, the electric-power/motive-power input/output mechanism may include a generator-motor operable to receive and deliver motive power, and a three-axes-type power input/output mechanism connected to three shafts consisting of the driveshaft, the engine shaft of the engine, and a rotary shaft of the generator-motor. The three-axes-type power input/output mechanism is operable to provide or receive power based on power received from or provided to two of the above-indicated three shafts, to or from the remaining one of the three shafts.

The vehicle of the present invention includes any one of the power output systems as described above, and driving wheels connected to the driveshaft. Since the vehicle includes the power output system of any of the above-described forms, the vehicle provides substantially the same effects as those provided by the power output system of the invention.

It is to be understood that the "internal combustion engine" is not limited to the engine 22 that provides power when it is supplied with a hydrocarbon-base fuel, such as gasoline or light oil, but may be of any other type, such as a hydrogen fueled engine. The "electric motoring mechanism", "electric motor" and "generator-motor" are not limited to synchronous generator-motors, such as the motors MG1, MG2, but may be of any other type, such as induction motors. The "electric storage device" is not limited to a secondary battery, such as the battery 36, but may be of any other type, such as a capacitor capable of supplying and receiving electric power to and from an electric motor(s). The "first exhaust gas channel" may be of any other type than that defined by the partition member 54, provided that most of the exhaust gas from the engine is directly fed to the exhaust gas purifying catalyst through the first exhaust gas channel. The "second exhaust gas channel" may be of any other type than that defined by the case 52 and the partition member 54, provided that the second exhaust gas channel contains the unburned component adsorber; such as the HC adsorbing member 56, and the exhaust gas that has passed through the unburned component adsorber is fed to the exhaust gas purifying catalyst through the second exhaust gas channel. The "channel switching mechanism" may be of any other type than the channel switching valve 59 and the actuator 60, provided that the channel switching mechanism is able to switch the channel of exhaust gas from the engine between the first exhaust gas channel and the second exhaust gas channel by using a negative pressure. The "pressure accumulator" may be of any other type than the vacuum tank 67, provided that a negative pressure produced through rotation of the engine can be accumulated or stored in the pressure accumulator. The "negative-pressure introducing/releasing mechanism" may be of any other type than the VSV 66, provided that it selectively permits and inhibits introduction of a negative pressure from the pressure accumulator into the channel switching mechanism. The "controller" is not limited to the combination of the hybrid ECU 40 and the motor ECU 35, provided that the controller controls the electric motoring mechanism and the negative-pressure introducing/releasing mechanism, based on the condition of the electric storage device and the pressure accumulation state of the pressure accumulator, but may be of any other type, such as a single electronic control unit. The "electric-power/motive-power input/output mechanism" is not limited to the combination of the motor MG1 and the power distribution/integration mechanism 30, but may be of any other type, such as the paired rotor motor 230 that is connected to the engine shaft of the internal combustion engine and the driveshaft or axle shaft so as to receive and provide electric power and motive power, thereby to receive and provide power from and to the engine shaft and the driveshaft.

The correlation between the principal elements of the illustrated embodiment and the principal elements of the present invention is to be interpreted as one example for specifically describing the best mode for carrying out the present invention, and it is, therefore, to be understood that the elements of the invention are not limited to those of the illustrated embodiment. Namely, the illustrated embodiment is merely a specific example of the present invention, and the invention should be interpreted based on the description of the "SUMMARY OF THE INVENTION".

The present invention may be used in, for example, power output systems, or the industry of manufacture of vehicles, or the like.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A power output system that provides power to a driveshaft, comprising:
    an internal combustion engine operable to provide power to the driveshaft;
    an electric motoring mechanism that performs motoring, in which the internal combustion engine is forcedly rotated;
    an electric storage device that supplies electric power to the electric motoring mechanism;
    a first exhaust gas channel that guides exhaust gas from the internal combustion engine directly to an exhaust gas purifying catalyst;
    a second exhaust gas channel which contains an unburned-component adsorber absorbs an unburned component in the exhaust gas, and which guides the exhaust gas that has passed the unburned-component adsorber to the exhaust gas purifying catalyst;
    a channel switching mechanism that switches a channel of the exhaust gas from the internal combustion engine between the first exhaust gas channel and the second exhaust gas channel, by using a negative pressure;
    a pressure accumulator connected to an intake system of the internal combustion engine and that accumulates therein a negative pressure produced through rotation of the internal combustion engine;
    a negative-pressure introducing/releasing mechanism that selectively permits and inhibits introduction of the negative pressure from the pressure accumulator into the channel switching mechanism; and
    a controller that controls the electric motoring mechanism and the negative-pressure introducing/releasing mechanism so as to cause the electric motoring mechanism to effect motoring and thereby switch a channel of the exhaust gas from the first exhaust gas channel to the second exhaust gas channel, when the electric storage device is in a condition that permits the motoring by the electric motoring mechanism, prior to start up of the internal combustion engine; and for controlling the electric motoring mechanism and the negative pressure introducing/releasing mechanism so as to switch the channel of the exhaust gas from the first exhaust gas channel to the second exhaust gas channel by using only the negative pressure accumulated in the pressure accumulator, without effecting motoring by the electric motoring mechanism, when the electric storage device is not in the condition that permits the motoring by the electric motoring mechanism, prior to start-up of the internal combustion engine, and a pressure accumulation state of the pressure accumulator satisfies a predetermined condition.

2. The power output system according to claim 1, wherein when the electric storage device is in a condition that permits the motoring by the electric motoring mechanism, prior to start-up of the internal combustion engine, the controller sets a period of time for which motoring is effected by the electric motoring mechanism, based on a pressure accumulated in the pressure accumulator and an atmospheric pressure, and controls the electric motoring mechanism so as to effect the motoring for the set period of time.

3. The power output system according to claim 2, wherein when the electric storage device is in a condition that permits the motoring by the electric motoring mechanism, prior to start-up of the internal combustion engine, the controller sets the period of time for which motoring is effected, based on the pressure accumulated in the pressure accumulator, the atmospheric pressure, and a condition of the electric storage device.

4. The power output system according to claim 1, wherein:
    the electric motoring mechanism comprises an electric motor operable to perform the motoring, in which the internal combustion engine is forcedly rotated and operable to provide power to the driveshaft; and
    intermittent operation of the internal combustion engine is inhibited when the pressure accumulation state of the pressure accumulator does not satisfy a predetermined condition during operation of the internal combustion engine.

5. The power output system according to claim 4, wherein when the pressure accumulation state of the pressure accumulator does not satisfy the predetermined condition when a stop command is generated to the power output system, idling of the internal combustion engine is performed or the motoring by the electric motoring mechanism is performed so that the pressure accumulation state of the pressure accumulator satisfies at least the predetermined condition.

6. The power output system according to claim 4, further comprising electric-power/motive-power input/output mechanism connected to the driveshaft and an engine shaft of the internal combustion engine and adapted to receive and deliver electric power and motive power so as to provide at least a part of the power of the internal combustion engine toward the driveshaft and supply and receive electric power to and from the electric storage device.

7. The power output system according to claim 6, wherein the electric-power/motive-power input/output mechanism comprises a generator-motor operable to receive and deliver motive power, and a three-axes-type power input/output mechanism connected to three shafts consisting of the driving shaft, the engine shaft of the internal combustion engine and a rotary shaft of the generator-motor, said three-axes-type power input/output mechanism being operable to provide or receive power, based on power received from or provided to two of said three shafts, to or from a remaining one of the three shafts.

8. A vehicle comprising the power output system according to claim 1, and driving wheels connected to the driveshaft.

9. A method of controlling a power output system including:
    an internal combustion engine operable to provide power to a driveshaft;
    electric motoring means for performing motoring, in which the internal combustion engine is foredly rotated;
    electric storage means for supplying electric power to the electric motoring means;
    a first exhaust gas channel that guides exhaust gas from the internal combustion engine directly to an exhaust gas purifying catalyst;
    a second exhaust gas channel which contains unburned-component adsorbing means for adsorbing an unburned component in the exhaust gas, and which guides the exhaust gas that has passed the unburned component adsorbing means to the exhaust gas purifying catalyst;
    channel switching means for switching a channel of the exhaust gas from the internal combustion engine between the first exhaust gas channel and the second exhaust gas channel, by using a negative pressure;

pressure accumulating means connected to an intake system of the internal combustion engine, for accumulating therein a negative pressure produced through rotation of the internal combustion engine; and negative-pressure introducing/releasing means for selectively permitting and inhibiting introduction of the negative pressure from the pressure accumulating means into the channel switching means, said method comprising:

controlling the electric motoring means and the negative-pressure introducing/releasing means so as to cause the electric motoring means to effect motoring and thereby switch a channel of the exhaust gas from the first exhaust gas channel to the second exhaust gas channel, when the electric storage means is in a condition that permits the motoring by the electric motoring means, prior to start-up of the internal combustion engine; and controlling the electric motoring means and the negative-pressure introducing/releasing means so as to switch the channel of the exhaust gas from the first exhaust gas channel to the second exhaust gas channel by using only the negative pressure accumulated in the pressure accumulating means, without effecting motoring by the electric motoring means, when the electric storage means is not in the condition that permits the motoring by the electric motoring means, prior to start-up of the internal combustion engine, and the pressure accumulation state of the pressure accumulating means satisfies a predetermined condition.

* * * * *